(12) United States Patent
Baroudi et al.

(10) Patent No.: US 10,849,046 B2
(45) Date of Patent: *Nov. 24, 2020

(54) DENSITY-BASED METHOD FOR SELECTING A RELAY NODE

(71) Applicant: KING FAHD UNIVERSITY OF PETROLEUM AND MINERALS, Dhahran (SA)

(72) Inventors: Uthman Baroudi, Dhahran (SA); Md. Enamul Haque, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,892

(22) Filed: Feb. 6, 2019

(65) Prior Publication Data

US 2020/0029267 A1    Jan. 23, 2020

Related U.S. Application Data

(63) Continuation of application No. 15/605,089, filed on May 25, 2017, now Pat. No. 10,264,511.

(51) Int. Cl.
*H04W 40/22*    (2009.01)
*H04B 7/155*    (2006.01)
(Continued)

(52) U.S. Cl.
CPC ............ *H04W 40/22* (2013.01); *H04B 7/155* (2013.01); *H04B 7/2606* (2013.01); *H04W 40/10* (2013.01); *H04W 84/18* (2013.01)

(58) Field of Classification Search
CPC ..... H04W 40/00; H04W 40/02; H04W 40/04; H04W 40/10; H04W 40/22; H04W 48/00;
(Continued)

(56) References Cited

U.S. PATENT DOCUMENTS 7,813,326 B1    10/2010    Kelm
7,925,730 B1    4/2011    Gotsman
(Continued)

OTHER PUBLICATIONS

Kai, Z., et al., "Location-Based Routing Algorithms for Wireless Sensor Network", ZTE, URL: http://wwwen.zte.com.cn/endata/magazine/ztecommunications/2009year/no1/articles/2009_03/t20090319_170883.html, 9 Pages total, (2009), Note: Copy in U.S. Appl. No. 15/605,089.

*Primary Examiner* — Tri H Phan
(74) *Attorney, Agent, or Firm* — Oblon, McClelland, Maier & Neustadt, L.L.P.

(57) ABSTRACT

Aspects of the disclosure provide a method for selecting a relay node at a first node for transmitting a packet from the first node to a destination node in a wireless sensor network that includes a plurality of nodes. The method can include establishing a transmission angle within which the relay node is preferentially selected, wherein a bounding box surrounding the destination node is between a first side and a second side of the transmission angle, and selecting a second node having a highest remaining energy level among energy levels of neighbor nodes of the first node within the transmission angle to be the relay node. In one example, the candidate nodes for selecting the second node have a remaining energy level above a threshold.

8 Claims, 8 Drawing Sheets

(51) Int. Cl.
*H04B 7/26* (2006.01)
*H04W 40/10* (2009.01)
*H04W 84/18* (2009.01)

(58) Field of Classification Search
CPC ..... H04W 48/08; H04W 48/16; H04W 48/20; H04W 64/00; H04W 84/18; H04W 88/04; H04W 88/08; H01Q 25/00; Y02D 30/20; Y02D 70/38; Y02D 70/39; Y02D 70/446; H04B 7/155; H04B 7/2606
See application file for complete search history.

(56) References Cited

U.S. PATENT DOCUMENTS

| | | | |
|---|---|---|---|
| 7,957,355 B1 | 6/2011 | Heiferling | |
| 8,504,059 B2 * | 8/2013 | Huang | G01S 5/02 |
| | | | 370/252 |
| 8,504,061 B2 * | 8/2013 | Grainger | H04W 4/021 |
| | | | 455/456.1 |
| 8,788,613 B2 * | 7/2014 | Johnson | G01C 21/005 |
| | | | 709/217 |
| 9,148,849 B2 | 9/2015 | Akhlaq | |
| 9,307,353 B2 * | 4/2016 | Harris | H04W 4/021 |
| 9,838,943 B2 | 12/2017 | Baroudi | |
| 9,916,326 B2 * | 3/2018 | Hendrey | G06F 16/29 |
| 10,264,511 B2 * | 4/2019 | Baroudi | H04W 40/10 |
| 2002/0044533 A1 | 4/2002 | Bahl et al. | |
| 2005/0195761 A1 | 9/2005 | Alicherry | |
| 2006/0077918 A1 | 4/2006 | Mao | |
| 2009/0147714 A1 | 6/2009 | Jain et al. | |
| 2014/0153386 A1 | 6/2014 | Kim et al. | |
| 2014/0328240 A1 | 11/2014 | Munari et al. | |
| 2017/0332198 A1 | 11/2017 | Dannenbring | |
| 2018/0137671 A1 | 5/2018 | Rudolf | |
| 2018/0165400 A1 | 6/2018 | Feld | |

* cited by examiner

| Parameter | Value |
|---|---|
| 601 — Number of topology | 10 |
| 602 — Network area | 4000 sq.meter |
| 603 — Number of nodes | 80, 100, 120, 150 |
| 604 — Number of source nodes/rounds | 30 |
| 605 — Transmission range | 50, 60, 70, 80 meter |
| 606 — Initial energy | 0.3-1.0 J |
| 607 — Threshold energy | 0.2 J |
| 608 — Packet size | 100 byte |
| 609 — Energy model | First order radio model |

DENSITY-BASED METHOD FOR SELECTING A RELAY NODE

CROSS-REFERENCE TO RELATED APPLICATIONS

The present application is a Continuation of Ser. No. 15/605,089, now allowed, having a filing date of May 25, 2017.

TECHNICAL FIELD

The disclosure relates to routing methods in wireless sensor networks including vehicular networks (VANET). Particularly, the disclosure provides a method for selecting a relay node for transmitting a packet to a destination node in a wireless sensor network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless sensor networks and its applications have gained popularity in numerous application areas. The application areas include but not limited to agriculture, military, surveillance, vehicular networks, smart grids, body area network, flight status tracking, health-care monitoring, structural health monitoring, etc. In most cases, the sensors are deployed to monitor the intended events. The sensors generate sensor data indicating the events and transmit the sensor data to next relays. One characteristic of wireless sensor networks is the limited battery lifetime which imposes restrictions on using high data rate, mobility, etc.

Another challenge is routing event-data through wireless sensor networks. Some location aided routing protocols have been developed. The location aided routing protocols use geographic locations of the sensor nodes and some other parameters to discover or determine routes for sensor data transmission.

Location-Aided Routing (LAR) is described in the work of Ko, Y. B. and Vaidya, N. H. (2000), "Location-Aided Routing (LAR) In Mobile Ad Hoc Networks", Wireless Networks, 6(4):307-321, which is incorporated herein by reference in its entirety. LAR uses Global Positioning System (GPS) to collect location information of a node and reduces the route discovery overhead. Once a source node collects the location information of a target node along with information of mobility, the source node sends route request to those nodes which are only within an expected zone. In a worst case, the whole network is considered as the expected zone when the mobility and the movement direction of the target node cannot be acquired.

Distance Routing Effect Algorithm for Mobility (DREAM) is described in the work of Basagni, S., Chlamtac, I., Syrotiuk, V. R., and Woodward, B. A. (1998), "A Distance Routing Effect Algorithm for Mobility (DREAM)", in Proceedings of the 4th annual ACM/IEEE International Conference on Mobile Computing and Networking, pages 76-84, ACM, which is incorporated herein by reference in its entirety. DREAM is a part proactive and part reactive routing protocol that uses locations of nodes with GPS and sends packets using selective flooding. The major difference from other location-based protocols is the use of data packet forwarding instead of control packet forwarding. DREAM protocol is based on the observations of the distance effect and mobility effect. Both of the observations contribute to a location table update at each node. The distance effect makes less frequent update of the location table when the distance between sender-receiver pair is longer. On the other hand, the mobility effect regulates how often the location information packets should be generated and forwarded. Usually, the whole network should update the location table if any node moves. A node keeps generating its location update packets at periodic intervals which can be a function of its mobility. Thus, the nodes with higher mobility generate frequent location update which helps to reduce the overhead.

Greedy Perimeter Stateless Routing (GPSR) is described in the work of Karp, B. and Kung, H. T. (2000), "GPSR: Greedy Perimeter Stateless Routing for Wireless Networks", in Proceedings of the 6th Annual International Conference on Mobile Computing and Networking, pages 243-254, ACM, which is incorporated herein by reference in its entirety. GPSR also uses node location information to carry out the packet forwarding between sensor nodes. The packet forwarding is accomplished on a greedy basis by selecting the node closest to the destination. In case of obstacle avoidance, a well-known right hand rule is applied before resuming to the greedy forwarding.

Location Aided Knowledge Extraction Routing (LAKER) is described in the work of Li, J. and Mohapatra, P. (2003), "LAKER: Location Aided Knowledge Extraction Routing for Mobile Ad Hoc Networks", in Wireless Communications and Networking Conference, 2003, 2003 IEEE, volume 2, pages 1180-1184, which is incorporated herein by reference in its entirety. LAKER uses zonal area while forwarding packets and extracts knowledge of the nodal density and remembers a series of important locations on the path of the destination. The route discovery process is narrowed down with the help of these important locations. LAKER works similarly by following the routing strategy of Dynamic Source Routing (DSR) algorithm and creates its own guiding routes. LAKER is descendant of DSR and LAR routing which use on-demand request-reply mechanism for route discovery. The control packet contains the forwarding route and guiding route information along with the characteristics of DSR and LAR which decrease the forwarding area of the route requests.

Movement-Based Algorithm for Ad Hoc Networks (MORA) is described in the work of Granelli, F., Boato, G., and Kliazovich, D. (2006), "Mora: A Movement-Based Routing Algorithm for Vehicle Ad Hoc Networks, in IEEE Workshop on Automotive Networking and Applications (AutoNet 2006), San Francisco, USA, which is incorporated herein by reference in its entirety. MORA also uses the location of the nodes while routing packets. The major difference is using the movement of the neighboring nodes while selecting a route. The optimal path is selected based on the outcome of a specific function, F, which depends on the line joining source-destination (SD) pair and the direction of the movement. The function, F, should reach the maxima when the node is moving on SD.

SUMMARY

Aspects of the disclosure provide a method for selecting a relay node at a first node for transmitting a packet from the first node to a destination node in a wireless sensor network that includes a plurality of nodes. The method can include establishing a transmission angle within which the relay node is preferentially selected, wherein a bounding box surrounding the destination node is between a first side and a second side of the transmission angle, and selecting a second node having a highest remaining energy level among energy levels of neighbor nodes of the first node within the transmission angle to be the relay node. In one example, the candidate nodes for selecting the second node have a remaining energy level above a threshold.

In one example, the method further includes selecting a third node having a remaining energy level above the threshold and having a maximum remaining energy among neighbor nodes of the first node out of the transmission angle to be the relay node when there is no neighbor node within the transmission angle having a remaining energy level above a threshold. In addition, when the first node does not have a neighbor node having a remaining energy level above the threshold within the transmission range, the transmission range of the first node is expanded, and a fourth node having a remaining energy level above the threshold and having a maximum remaining energy among neighbor nodes of the first node that is within the expanded transmission range and within the transmission angle is selected to be the relay node. Further, when there is no neighbor node, within the expanded transmission range and within the transmission angle, having a remaining energy level above a threshold, a fifth node having a remaining energy level above the threshold and having a maximum remaining energy among neighbor nodes of the first node out of the transmission angle and within the expanded transmission range is selected to be the relay node. In one example, the bounding box has a shape of a regular polygon or a circle centered at a location of the destination node.

Embodiments of the method can further include determining a size of the bounding box such that an angle of the transmission angle is above a threshold. In one example, the method further includes transmitting from the first node a request for remaining energy level information and location information of neighbor nodes of the first node. In one example, nodes that have been previously passed by the packet are excluded from the candidate nodes.

Aspects of the disclosure provide a sensor node for selecting a relay node for transmitting a packet from the sensor node to a destination node in a wireless sensor network that includes a plurality of nodes. The sensor node can include circuitry configured to establish a transmission angle within which the relay node is preferentially selected, wherein a bounding box surrounding the destination node is between a first side and a second side of the transmission angle, and select a first node having a highest remaining energy level among energy levels of neighbor nodes of the sensor node within the transmission angle to be the relay node.

Aspects of the disclosure provide a sensor network. The sensor network includes a sensor node that includes circuitry configured to establish a transmission angle. A relay node within the transmission angel is preferentially selected for transmitting a packet from the sensor node to a destination node in the sensor network. A bounding box surrounding the destination node is between a first side and a second side of the transmission angle. The circuitry is further configured to select a first node as the relay node, wherein the first node has a highest remaining energy level among energy levels of neighbor nodes of the sensor node within the transmission angle.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Sensor networks are widely used in numerous applications. Usually, the sensor devices are employed in a region of interest to collect data at certain intervals and report to predetermined location(s). Sensor energy depletion rate depends on the different data collection intervals, the routing distance between source and target node, network congestion, propagation delay, etc. In this disclosure, a novel geographic location aware dynamic energy efficient routing (GA-DEER) protocol is described. GA-DEER protocol extends a session length between any source and target sensor by selecting intermediate relay nodes with maximum remaining energy towards the target node. Under a first condition, a maximum allowable transmission angle (also referred to as focus angle) created between a source node and a target node is 180 degree which minimizes the routing distance. In a second condition, the focus angle is extended to 360 degrees to avoid an empty neighborhood issue.

Figure 1:
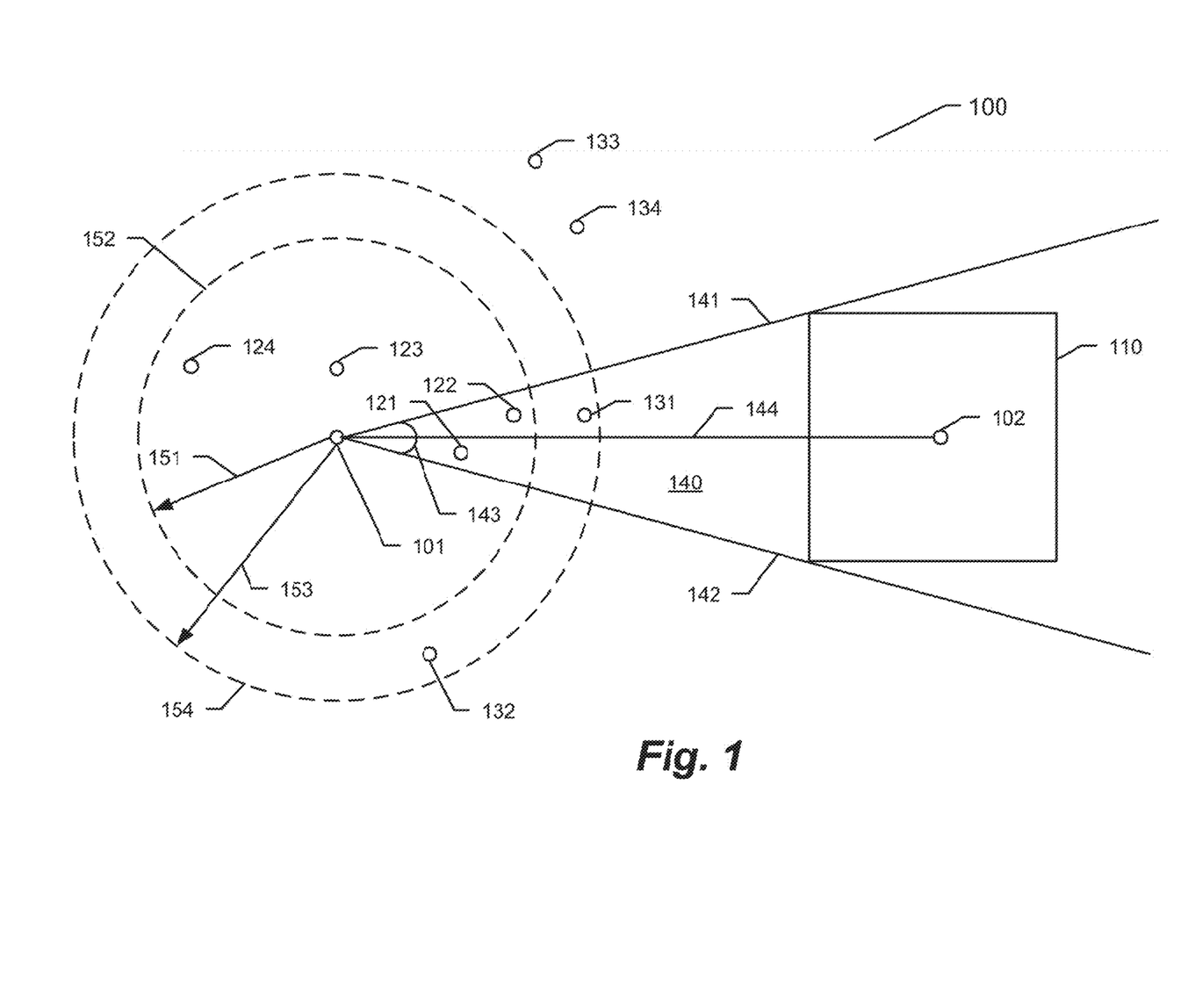
FIG. 1 shows a wireless sensor and actor network according to an embodiment of the disclosure.

FIG. 1 shows a wireless sensor and actor network 100 according to an embodiment of the disclosure. The network 100 can include a plurality of nodes, such as nodes 101, 102, 121-124, and 131-134. In various examples, the plurality of nodes can cooperate with each other to collectively perform various operations.

The nodes of the network 100 can be of different types. For example, the nodes may include sensor nodes, actor nodes, base stations, and the like. A sensor node can sense surrounding environment and generate sensor data indicating changes of the surrounding environment or events in the surrounding environment. An actor node can have more resources than a sensor node. For example, an actor node may have a larger battery capacity, more powerful data processing capability, and may be capable of moving and performing some actions in response to changes in the surrounding environment. A base station can be configured to receive sensor data from sensor nodes or actor nodes, or issue commands to actor nodes to trigger various actions. Some of the nodes can be stationary, such as sensor nodes and base stations, while some of the nodes can be mobile, such as actor nodes.

The nodes of the network 100 can each be equipped with a positioning system, such as the Global Positioning System (GPS), and obtain geographic location information of respective node from the positioning system. In addition, a node of the network can wirelessly communicate with neighbor nodes located within a transmission range of the node. For example, location information or remaining energy level information can be exchanged between the nodes.

In one example, a first node 101, referred to as a transmission node 101, performs a routing process to determine a relay node in order to transmit a packet to a destination node 102. The transmission node 101, the relay node, or the destination node 102 can be a sensor node, an actor node or a base station, and can be stationary or mobile. The packet can include sensor data or other types of data for various purposes, such as an action command, a request or reply message, and the like. The packet can be initiated locally at the transmission node 101. Alternatively, the transmission node 101 can receive the packet from other nodes and attempt to forward the packet to the destination node 102. The determined relay node can be used to receive the packet from the transmission node 101 and forward the packet to the destination node 102, for example, by determining a next relay node.

According to an aspect of the disclosure, the routing process for determining a relay node first defines a transmission angle (also referred to as a focus angle) based on a bounding box 110 surrounding the destination node 102. Then, based on geographic location information of the neighbor nodes of the transmission node 101, neighbor nodes within the transmission angle are preferentially considered for selection of the relay node compared with neighbor nodes outside of the transmission angle. In addition, remaining energy levels of the neighbor nodes are employed for determination of the relay node. A neighbor node with a highest remaining energy level would be selected to be the relay node. As a result, the routing technique described herein can advantageously increase the probability of selecting a data transmission route that has a shorter travel distance and a longer transmission session compared with other conventional routing techniques. GA-DEER protocol employs the routing technique described herein.

In one example, the routing process can include the following phases. During an initial phase, the transmission node 101 defines a transmission angle 140 based on a bounding box 110 surrounding the destination node 102 as shown in FIG. 1. The bounding box 110 can be an area surrounding the destination node 102. The bounding box 110 is shown as a square-shaped region in FIG. 1. However, the bounding box 110 can have various shapes in other examples. For example, the bounding box 110 can have a shape of a circle, a regular polygon, a rectangle, or other irregular polygon. When the bounding box 110 is in a shape of a circular or regular polygon, it can be centered at the location of destination node 102, or a location other than the location of the destination node 102.

In one example, the transmission angle 140 takes the location of the transmission node 101 as its vertex, and has an angle 143 that is a minimum angle for the transmission angle 140 to include the bounding box 110 within two sides 141 and 142 of the transmission angle 140.

In one example, the size of the bounding box 110 is determined with respect to the distance 144 between the transmission node 101 and the destination node 102. For example, in FIG. 1, when the transmission node 101 is far from the destination node 101, the angle 143 may be smaller than an angle when the transmission node 101 is closer to the destination node 101. A smaller transmission angle 140 may include fewer candidate nodes for determination of a relay node, which may thus reduce probability of successfully routing the packet to the destination node 102 from the transmission node 101. In contrast, a larger transmission angle 140 may include more candidate nodes, which may lead to a route for transmitting the packet having a longer travel distance, and/or increase processing workload of the routing process due to increased number of candidate nodes. When the transmission node 101 is far from the destination node 102, in order to include enough candidate nodes in the transmission angle 140 for selection of a relay node, the size of the transmission angle 140 is desired to be larger than a threshold. Accordingly, the size of the bounding box 110 is determined in a way that the size of the transmission angle 140 can be set to be larger than a threshold.

In another example, size of the bounding box 110 is determined with respect to a density of the nodes in the network 100. For example, the network 100 may have different node densities for different applications. Accordingly, size of the bounding box 110 can be adapted to the node densities for similar reasons as described above. Specifically, for a network 100 having a higher node density, size of the bounding box 110 can be smaller than that of a network 100 having a lower node density, such that neighbor nodes within the transmission angle can be reduced.

After the transmission angle 140 is defined, during a second phase, the transmission angle 140 is used to filter candidate nodes for determining a relay node. Specifically, neighbor nodes of the transmission node 101 are divided into two groups: neighbor nodes inside the transmission angle 140, and neighbor nodes outside the transmission angle 140. Neighbor nodes of the transmission node 101 refer to nodes within a transmission range of the transmission node 101. For example, in FIG. 1, the transmission node 101 has a first transmission range 151 corresponding to a first coverage area 152. Accordingly, the nodes 121-124 are neighbor nodes of the transmission node 101 corresponding to the first transmission range 151, and are included in the coverage area 152.

In one example, the transmission node 101 first attempts to select a node from the neighbor nodes inside the transmission angle 140. For example, the transmission node 101 selects one of the neighbor nodes inside of the transmission angle 140 to be the relay node. The selected node has a highest remaining energy level among the neighbor nodes inside of the transmission angle 140. Selection of a node with a maximum remaining energy level among candidate neighbor nodes can make a route via the selected node to have a longer lifetime for packet transmission compared with selecting other candidate nodes with a lower remaining energy level. In addition, selection of a node with a highest remaining energy level can balance energy depletions among nodes within the network 100. For example, when a relay node completes a packet transmission session (which may last for a period of time for transmitting multiple packets), the relay node may not be selected for a next transmission session due to the reduced remaining energy level. Instead, another neighbor node whose energy level is lower previously but now higher than the relay node may be selected to perform the transmission.

In another example, neighbor nodes inside of the transmission angle 140 that have a remaining energy level below a threshold are excluded from the candidate neighbor nodes during the relay node selection process. In this way, a selected node can be guaranteed to operate for a period of time before exhausting the remaining energy. Accordingly, a packet transmission route via the relay can be secured to have a lifetime above a certain level.

In the example, assuming the nodes 121-122 within the transmission angle 140 do not exist, the transmission node 101 can then try to select a node from the neighbor nodes outside of the transmission angle 140. For example, a node having a remaining energy level above the threshold and having a highest remaining energy level among the candidate nodes outside of the transmission angle 140 can be selected to be the relay node.

During a third phase, assuming the nodes 121-124 do not exist, and the transmission node 101 does not have a neighbor node within the first transmission range 151, the transmission node 101 can expand its transmission range from the first transmission range 151 to a second transmission range 153 to discover additional neighbor nodes within an expanded coverage area 154. For example, the transmission node 101 may increase a transmission power to exchange information with neighbor nodes 131-132 outside of the first transmission range 151, but within the expanded transmission range 153, to obtain location information and remaining energy level information of those neighbor nodes 131-132.

Based on the obtained information, the transmission node 101 can repeat the operations of the second phase described above to determine a relay node. Specifically, the transmission node 101 can first try to select a node from newly discovered neighbor nodes within the transmission angle 140. If no qualified nodes are found, the transmission node 101 can subsequently try to select a node from newly discovered neighbor nodes outside of the transmission angle 140. When no qualified nodes are found in the expanded area 154, the transmission node 101 would terminate the routing process. Additionally, the transmission node 101 may send a failure message to a previous relay node that transmitted the packet to the transmission node 101 indicating the failure of routing the packet.

The routing process discussed above uses location information of the destination node 102 and remaining energy level information as well as location information of the neighbor nodes of the transmission node 101. In one example, a base station is used to collect sensor data, and the nodes of the network 100 transmit or relay sensor data to the base station. In this case, the base station operates as a destination node. In another example, one of the sensor nodes or actor nodes of the network 100 that is stationery or moves with a low speed operates as a destination node. For example, a group of nodes may form a cluster and sensor data may be transmitted to a header node of the cluster. In both the above two examples, location of the destination nodes can be broadcasted to other nodes of the network 100 (including the transmission node 101), for example, by flooding messages in the network 100. As a result, in above examples, when the transmission node 101 starts to perform the routing process after receiving a packet, location information of the destination node 101 is available for the operation.

In order to obtain energy level information and location information of the neighbor nodes, in one example, the transmission node 101 exchanges information with its neighbor nodes. For example, the transmission node 101 can be initially in a sleep mode to save energy. After receiving a packet that is to be forwarded to a next relay node, the transmission node 101 may switch to an active mode. Subsequently, the transmission node 101 can transmit a request for remaining energy level information and location information to nodes within the coverage area 152. As described, some nodes of the network 100 can be mobile and members of the neighbor nodes of the transmission node 101 may change when the transmission node 101 is in sleep mode. After receiving a wireless signal carrying the request, nodes currently within the transmission range 151 of the transmission node 101 can transmit a reply message including information requested by the transmission node. In this way, location information and remaining energy level information of neighbor nodes can be obtained by the transmission node 101.

Figure 2:
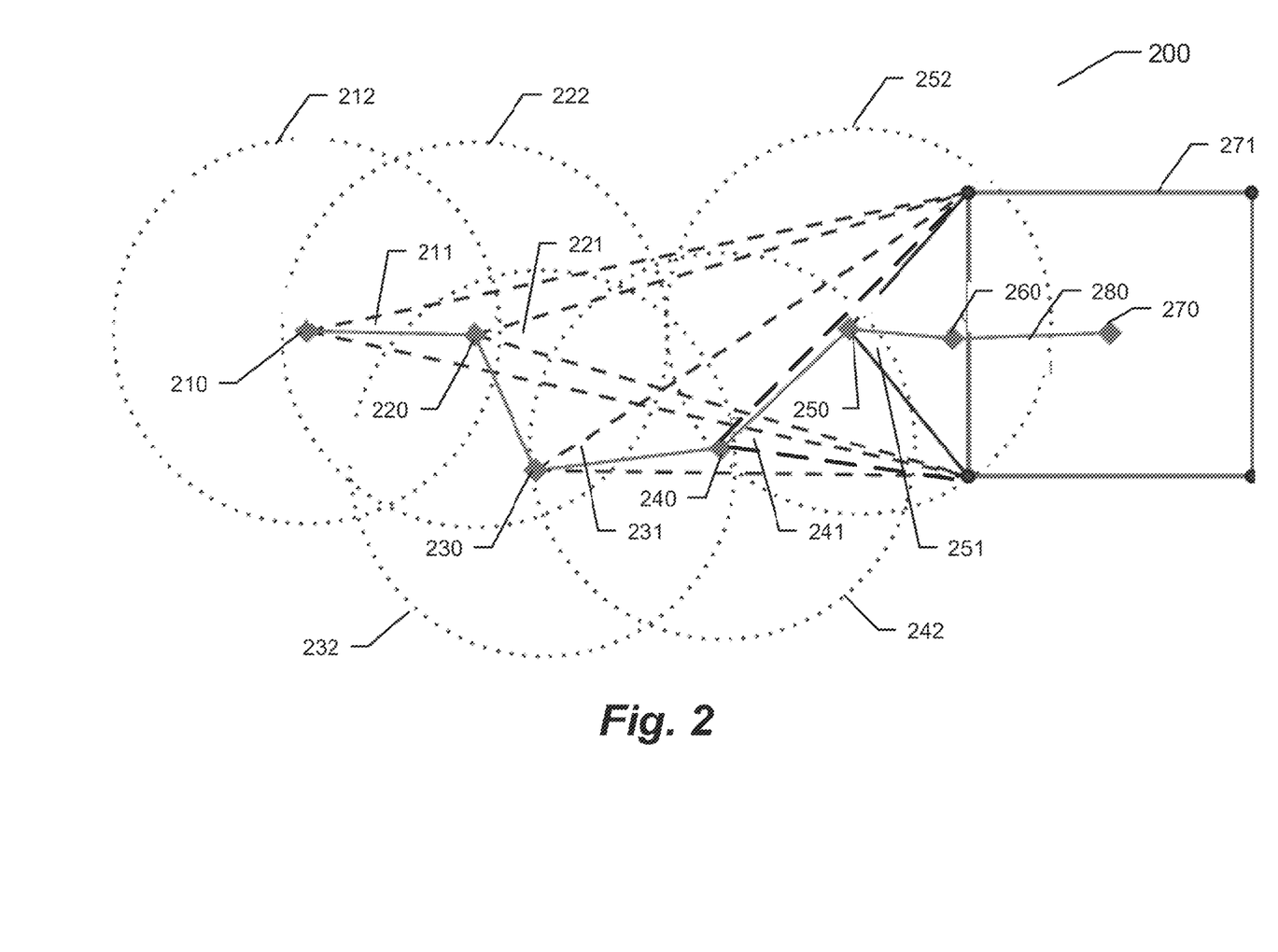
FIG. 2 shows a packet transmission process in a wireless sensor and actor network according to an embodiment of the disclosure.

FIG. 2 shows a packet transmission process in a wireless sensor and actor network 200 according to an embodiment of the disclosure. The network 200 includes a plurality of nodes, such as nodes 210-270. During the packet transmission process, a packet is transmitted from a source node 210 to a destination node 270 following a route 280 formed by a sequence of relay nodes 220-260. Each of the nodes 210-250 has a coverage area 212-252 corresponding to a respective transmission range of each node. Each of the nodes 210-260 performs a routing process similar to what is described above to determine a relay node.

For example, the source node 210 which initiates the packet can first exchange information with neighbor nodes of the source node 210 to acquire location information and remaining energy level information of the neighbor node. Thereafter, the source node may define a transmission angle 211 based on a bounding box 271 surrounding the destination node 270, and then select the node 220 to be the next relay based on the acquired location information and remaining energy level information. The node 220 is within the transmission angle 211, and can have a remaining energy level above a threshold and a highest remaining energy level among neighbor nodes of the node 210 within the transmission angle 211. The source node 210 subsequently transmits the packet to the node 220.

Similarly, the node 220 may first exchange information with neighbor nodes to acquire location information and remaining energy level information. Then, the node 220 defines a transmission angle 221. However, no qualified node is found within the transmission angle 221. Instead, the node 230 is found outside of the transmission angle 221 and within the coverage area 222 of the node 220, and is selected as the delay node. Similarly, the node 230 selects the node 240 to be the delay node that is within the transmission angle 231; the node 240 selects the node 250 to be the delay node that is within the transmission angle 241; the node 250 selects the node 260 to be the delay node that is within the transmission angle 251. At each of the nodes 220-250, the packet is forwarded to the next relay node after the next relay node is determined.

For the node 260, before defining a transmission angle, the node 260 first checks whether the destination node 270 is included in a coverage area of the node 260. The coverage area of the node 260 can correspond to a maximum transmission range of the node 260. The node 260 transmits the packet to the destination node 270 when it is determined the destination node 270 is within the transmission range of the node 260. In addition, the above checking operation can be performed at each of the nodes 210-250 before initiating the process for exchanging information with neighbor nodes. For example, as described, a relay node can know a location of a destination node in advance. After receiving a packet at a relay node, or generating a packet at a source node, the relay node or source node can first determine if a location of the destination node is within a coverage area of the relay node or source node. The coverage area corresponds to the maximum transmission range of the relay node or source node. When the destination node is within the coverage area, the routing process for determining a relay node can be skipped, and the packet can be directly delivered to the destination node.

In addition, in one example, a relay node along the transmission route 280 excludes nodes that have been passed previously by the transmission route 280 from the candidate nodes for selecting a relay node. For example, a packet arriving at the relay node 230 may carry a list of node identifications (IDs) of the nodes 210-220 that the packet has passed. Thus, during the process of determination a relay node, the node 230 may check the list of node IDs and excludes the nodes 210-220 from candidate neighbor nodes if any of the previously passed nodes are within the transmission range 232 of the node 230. In this way, circular movement of the packets can be avoided.

In the FIG. 2 example, a bounding box 271 having a constant size is used for determining the relay nodes for each of the sequence of nodes 210-250 along the route 280. However, in other examples, bounding boxes having different sizes can be used for different nodes along a packet transmission route, and nodes along the packet transmission route can determine size of a bounding box independently. For example, a relay node close to a destination node can use a smaller bounding box than nodes that are far from the same destination node. In FIG. 2, for example, the node 240 is closer to the destination node 270 than the node 220 that uses the bounding box 271 with the current size shown in FIG. 2. The node 240 can determine a bounding box surrounding the destination node 270 having a smaller size than the current size of the bounding box 271. For example, the size of the bounding box 271 can be reduced such that the transmission angle 241 can be reduced to below a threshold. In this way, fewer candidate neighbor nodes would be included in the transmission angle, which may lead to a transmission route with smaller travel distance from the node 240 to the destination node 270.

Figure 3:
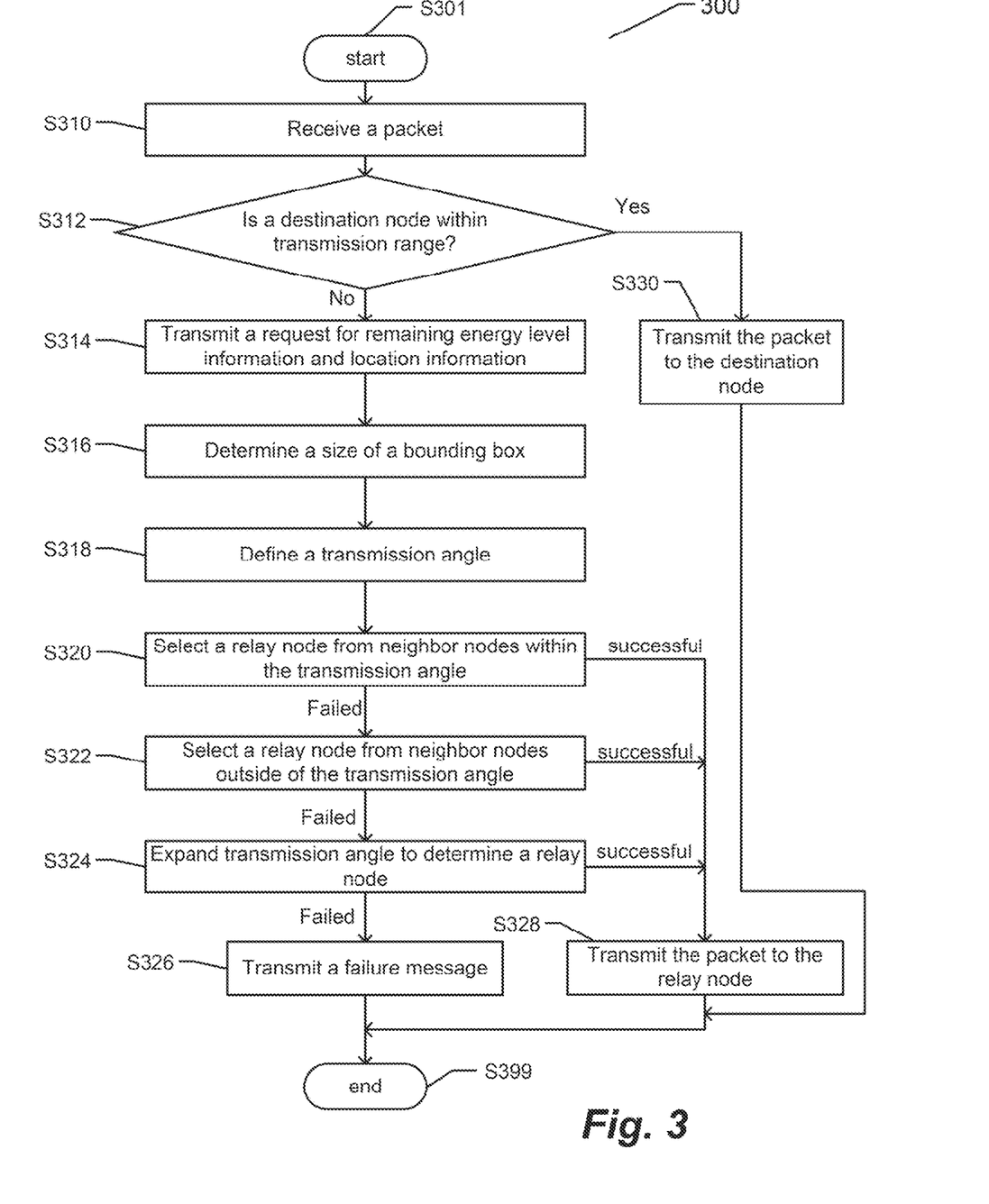
FIG. 3 shows a flow chart of a routing process for determining a relay node according to an embodiment of the disclosure.

FIG. 3 shows a flow chart of a routing process 300 for determining a relay node according to an embodiment of the disclosure. The process 300 can be performed at each of the nodes 210-260 in FIG. 2 or the node 101 in FIG. 1 to determine a relay node for transmission of a packet from a source node to the destination node in a wireless sensor and actor network. The process 300 starts at S301, and proceeds to S310.

At S310, a packet is received at a transmission node. As a response to reception of the packet, the transmission node may initiate a process to select a relay node for forwarding the packet to a destination node.

At S312, whether destination node is within the maximum transmission range of the transmission node is examined. When the destination node is within the maximum transmission range, the process proceeds to S330; otherwise, the process proceeds to S314.

At S314, a request for remaining energy level information and location information is transmitted to neighbor nodes of the transmission node within a first transmission range. As a result, the requested information can be obtained from the neighbor nodes.

At S316, a size of a bounding box surrounding the destination node can be determined. For example, the size of the bounding box can be determined in a way that size of a transmission angle defined based on the bounding box can be set among a preconfigured range, for example, larger than a first threshold and/or smaller than a second threshold.

At S318, a transmission angle is defined based on the bounding box determined at S316.

At S320, a trial for selecting a node from neighbor nodes within the transmission angle to be the relay node is performed based on location information and remaining energy information obtained at S314. A node having a remaining energy level larger than a threshold and having a highest remaining energy level among candidate neighbor nodes can be selected to be the relay node. When the trail is successful (a relay node is determined), the process 300 proceeds to S328; otherwise, proceeds to S322.

At S322, a trial for selecting a node from neighbor nodes outside of the transmission angle to be the relay node is performed based on location information and remaining energy information obtained at S314. Similarly, a node having a remaining energy level larger than a threshold and having a highest remaining energy level among candidate neighbor nodes can be selected to be the relay node. When the trail is successful (a relay node is determined), the process 300 proceeds to S328; otherwise, proceeds to S324.

At S324, transmission range of the transmission node is expanded from the first transmission range to a second transmission range to determine a relay node. For example, operations of S314, S320, and s322 can be performed based on the expanded transmission range. New candidate nodes within an expanded coverage area can be discovered and processed for determining a relay node. If a delay node is successfully determined, the process 300 proceeds to S328; otherwise, the process 300 proceeds to S326.

At S326, a message indicating a failure of selecting a next relay is transmitted to a node from which the packet is received. At S328, the packet is transmitted to the determined relay node. At S330, the packet is directly transmitted to the destination node which is within the transmission range of the transmission node. After S326, S328, or S330, the process 300 proceeds to S399, and terminates at S399.

It is noted that, in various examples, the steps of the process 300 can be performed in an order different from that of the FIG. 3 example. In addition, it is possible that fewer steps than in FIG. 3 can be performed in alternative examples for determining a relay node.

Figure 4:
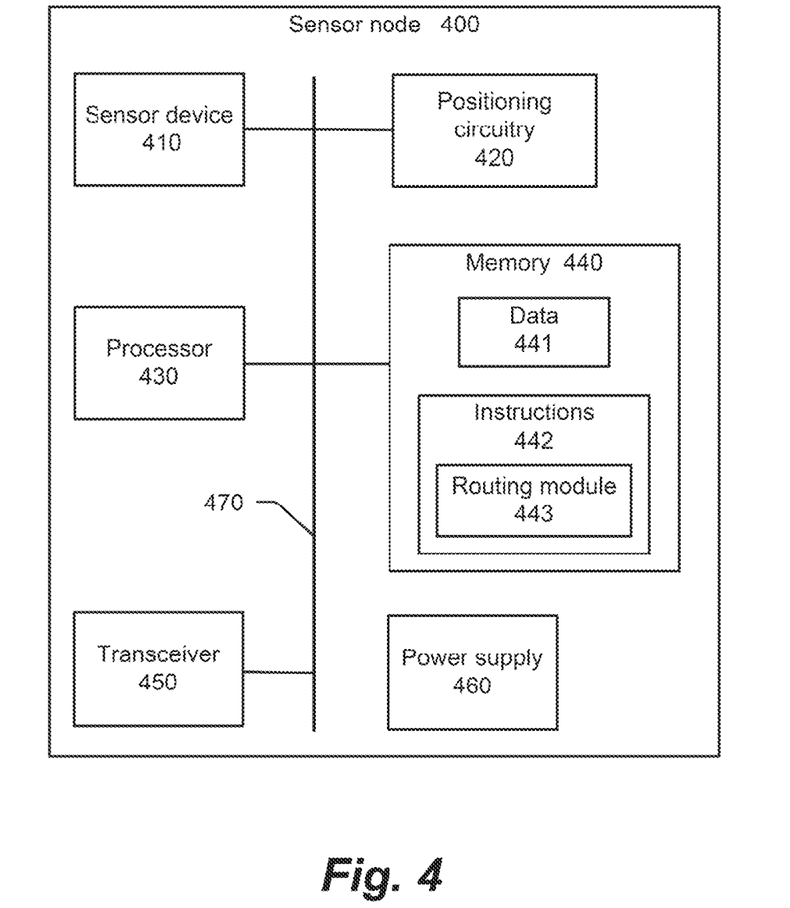
FIG. 4 shows an example sensor node according to an embodiment of the disclosure.

FIG. 4 shows an example sensor node 400 according to an embodiment of the disclosure. The node 400 can be a sensor node of the network 100 in FIG. 1 example. The sensor node 400 is configured to perform functions or processes for determining a relay node for transmission of a packet through a wireless sensor and actor network as described in above descriptions. In one example, the sensor node 400 includes a sensor device 410, positioning circuitry 420, a processor 430, a memory 440, and a transceiver 450, which are couple together through a bus structure 470. The sensor node 400 further includes a power supply 460 that provide electric power to other elements in the sensor node 400.

The sensor device 410 is configured to detect events or changes in surrounding environment, and generate sensor data indicating the captured events or changes. The sensor device 410 can include various types of sensors for sensing various aspects of the environment, such as light, motion, temperature, magnetic fields, gravity, humidity, moisture, vibration, pressure, electrical fields, sound, and the like. The positioning circuitry 420 is configured to generate location data indicating a current geographic location of the sensor node 400 when requested by the processor 430.

The memory 440 includes memory spaces for storing data 441 and computer program instructions 442. The data 441 can include data associated with the functions and processes of determining a relay node for transmitting packets as described in above descriptions. For example, the data 441 may include remaining energy level information and location information of neighbor nodes, location information of destination nodes, transmission range parameters, transmission angle or surrounding box size information calculated during the related processes, and the like. The data 441 may also include information carried in packets received at the sensor node 400, such as payload data, previously passed nodes, and the like. In addition, the data 441 can include sensor data received from the sensor device 410.

The instructions 442 can include a routing module 443 for performing the functions and processes for determining a relay node for routing packets as described above. In addition, the instructions 442 may include other instructions for the sensor node 400 to carry out various functions. The functions can include processing sensor data received from the sensor device 410, for example.

The memory 440 can include one or more storage media that provide memory spaces for various storage needs. The storage media can include, but are not limited to, hard disk drive, optical disc, solid state drive, read-only memory (ROM), dynamic random access memory (DRAM), static random access memory (SRAM), flash memory, and the like.

The processor 430 executes program instructions stored in the memory 440 to perform various functions. Particularly, the processor 430 executes instructions of the routing module 443 to perform the functions and processes described above for determining a relay node for transmission of packets. The processor 430 can include one or more processing units to execute various code instructions to perform various tasks. In an example, the processor 430 is a multi-core processor, such as a dual-core processor, a quad-core processor, and the like. In addition, in various examples, the processor 430 can have any suitable architecture, such as an x86 architecture, a reduced instruction set computing (RISC) architecture, a complex instruction set computing (CISC) architecture, and the like.

The transceiver 450 is configured to receive data, for example, a packet, from the processor 430 and transmit the data to neighbor nodes via a wireless signal. Conversely, the transceiver 450 receives wireless signal carrying data from neighbor nodes and passes the data to the processor 450 in one example. In one example, controlled by the processor 430, the transceiver 450 can adjust a transmission power of the wireless signal such that different transmission range can be achieved.

The power supply 460 can include a battery storing electric energy. Energy level of the battery may change due to operations of the sensor node 400. Accordingly, the power supply 460 can generate a signal indicating remaining energy level of the battery which can be employed by the processor 430 for performing the routing process.

It is noted that the sensor node 400 is for illustrative purpose, and sensor nodes in the network 100 may have various architectures and include various components for various applications.

According to an aspect of the disclosure, GA-DEER protocol has better performance than a conventional routing protocol, referred to as Dynamic Energy Efficient Routing (DEER) protocol, in terms of travel distance of a transmission route. DEER protocol selects a next forwarder based on the highest residual energy among neighbors of current sensor node. A neighbor node having the highest residual energy among neighbor nodes of a current node is selected to be the relay node in DEER. The selection does not consider geographic locations of the neighbor nodes. According to the disclosure, a region of interest of GA-DEER can be smaller than a region of interest of DEER, which helps minimizing a travel distance. For example, for DEER protocol, every sensor node have a transmission angle, $\theta=360°$, which allows a transmission node to explore more neighbors compared to GA-DEER which has a transmission angle limit of $\theta<180°$.

Figure 5:
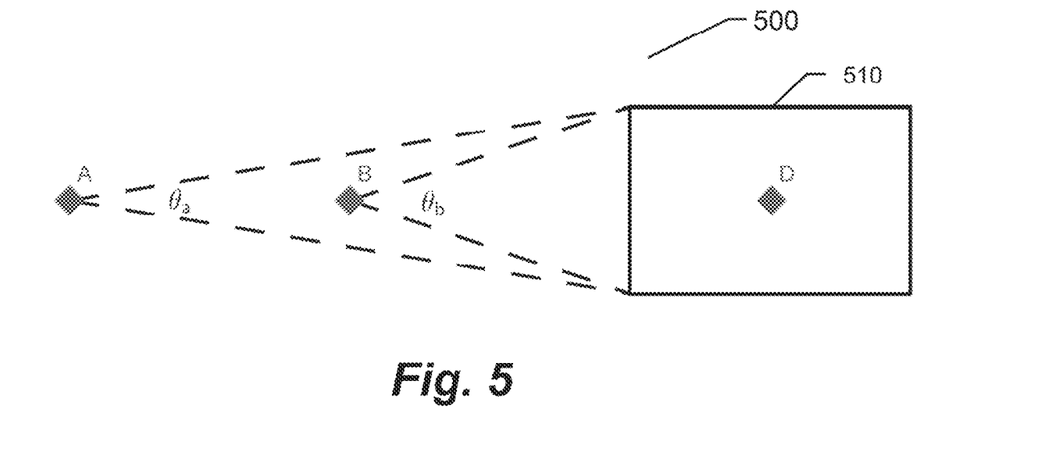
FIG. 5 shows a wireless sensor network according to an example.

FIG. 5 shows a wireless sensor network 500 according to an example. The network 500 includes two nodes, source node A and relay node B. Source node A transmits a packet through relay node B. In one example, nodes A and B select relay nodes using GA-DEER for transmission packets to a destination node D. A bounding box 510 is established for nodes A and B surrounding the destination D. Source node A creates smaller transmission angle than relay node B which decreases probability to cover less number of prospective relay neighbors in GA-DEER protocol. As the bounding box 510 is considered as a rectangle, a highest transmission angle equal to 180 degree is achieved when a transmission node lies on an edge of the rectangle 510. Transmission nodes (such as node A) at other locations create smaller transmission angle than the node lying on an edge of the rectangle 510. The more a sender node becomes closer to the bounding box 510, the larger the transmission angle of the sender node becomes.

In the FIG. 5, sender A is far from sender B with respect to the destination node, D. Thus, the transmission angle, $\theta_a$, is smaller than the transmission angle, $\theta_b$. Accordingly, GA-DEER selects relay nodes maintaining specific transmission angle smaller than 180 degree. On the other hand, a maximum transmission angle (180 degree) in GA-DEER is smaller compared to a transmission angle in DEER (360 degree). Thus, areas within transmission angles in GA-DEER are more focused towards the destination node compared with a 360 degree selection area in DEER. Consequently, a route selected by GA-DEER usually has a smaller travel distance than that selected by DEER. Empty neighborhood situations (for example, there is no neighbor nodes within transmission angle) force nodes to select relay nodes outside of focus area in GA-DEER, which can increase the travel distance of a selected route. For example, empty neighborhood situations may take place with a high probability in a sparse network.

In one example, simulation is performed to compare performance between GA-DEER and other conventional routing protocols including DEER, Dijkstra, and Opportunistic Routing (also referred to as Random Selection). Dijkstra algorithm provides shortest path from a sender node to all other nodes in the network using adjacency matrix and their corresponding weights. In the simulation, energy profiles of every node are used Dijkstra algorithm. Although Dijkstra ensures shortest path for every source-destination pair compared to DEER protocol, it does not guarantee higher message transmission. Dijkstra protocol is used as an evaluation metric to show degree of improvement in message transmission over traveled distance.

Opportunistic Routing selects any neighbor at each step randomly until the destination node is reached. Usually, sensor devices do not need to expand its active transmission range as it allows the sensor devices to select a node randomly at each step. A node needs to increase active transmission range when a recipient sensor device has a sender node as the only neighbor node to choose from (similar to empty neighborhood situation).

Figure 6:
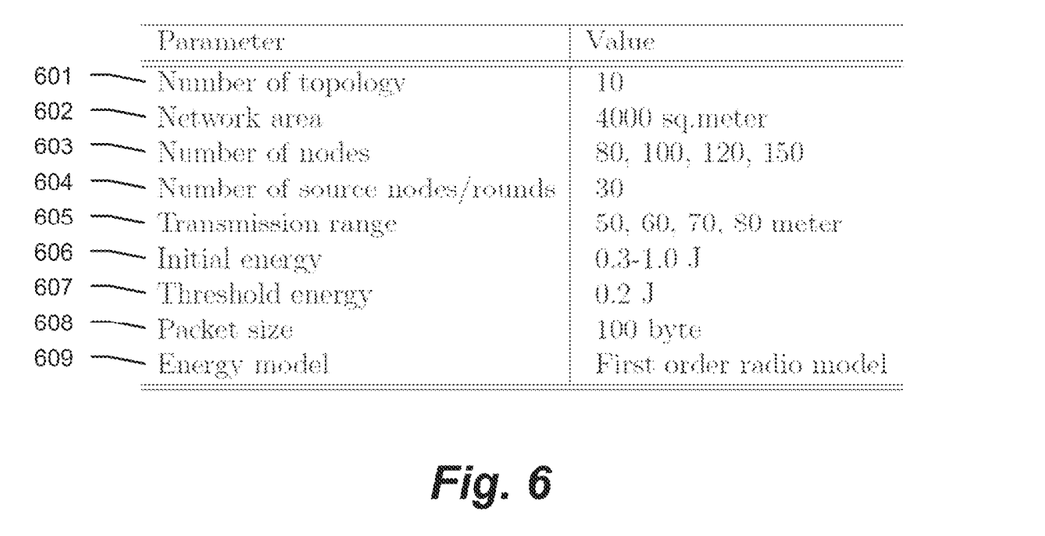
FIG. 6 shows parameters of a simulation according to an example.

FIG. 6 shows parameters used in the simulation. As shown, from row 601 to row 609, multiple parameters are listed: ten topologies are used for different tests; network area is set to be 4000 square meters; number of nodes is set to be 80, 100, and 150 for different tests; 30 source nodes are used, transmission rage of nodes is set at 50, 60, 70, 80 meters for different tests; initial energy of a node is set to be in a range of 0.3-1.0 J; threshold energy for selecting a node is set as 0.2J; packet size is set to be 100 bytes; first order radio model is adopted as energy model for the simulation.

The simulation takes the following assumptions:

Network topology: The sensor nodes create connected topology before packet transmission using the routing protocols.

Mobility: The protocols are simulated on the static nodes, although it is possible to extend the usage in mobile nodes with adaptive transmission range. The nodes are distributed randomly over the region of interest.

Energy profile: Each node has initial energy profile between 0.3-1.0 joule.

The nodes are embedded with GPS devices while simulating GA-DEER protocol as it needs the precise location of the destination node to create the transmission angle and bounding box.

The transmission ranges for the sensors are considered to be adaptive with controlled radio power. They can increase the range when empty set is returned with the default transmission range.

The region of interest is assumed to be obstacle free.

The nodes use TDMA scheduling to avoid any collision or redundant packet transmission.

Figure 7:
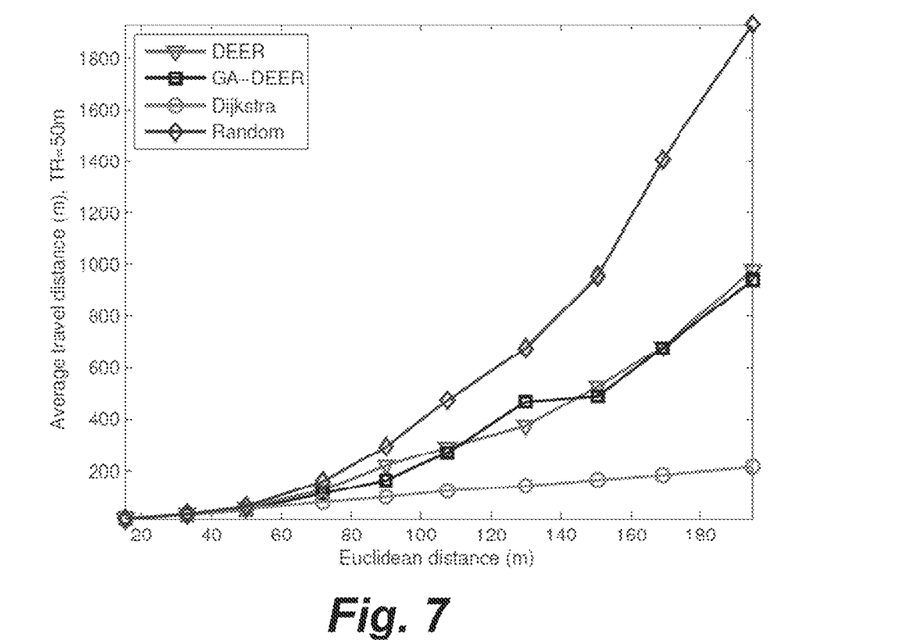
FIGS. 7-10 show results of the simulation.

FIGS. 7-10 show results of the simulation. The results demonstrate the performance characteristics of GA-DEER protocol by comparing with DEER, Dijkstra and Opportunistic Routing (Random Selection). For simplicity, the results presented consider a transmission range of 50 meters (TR=50 m as shown in FIGS. 7-10). FIG. 7 shows average travel distances for the four algorithms: DEER, GA-DEER, Dijkstra, and Opportunistic Routing (Random Selection). The vertical axis represents the average travel distance, while horizontal axis represents a distance between a source node and a destination node, referred to as Euclidean distance. Though GA-DEER has smaller search space for finding neighbors, GA-DEER has similar travel distance as DEER. This happens for shorter transmission range. As shorter transmission range may provide empty neighbor-set, the source/relay nodes need to switch to using DEER protocol in such cases. For longer transmission range, GA-DEER should travel less distance compared to DEER.

Figure 8:
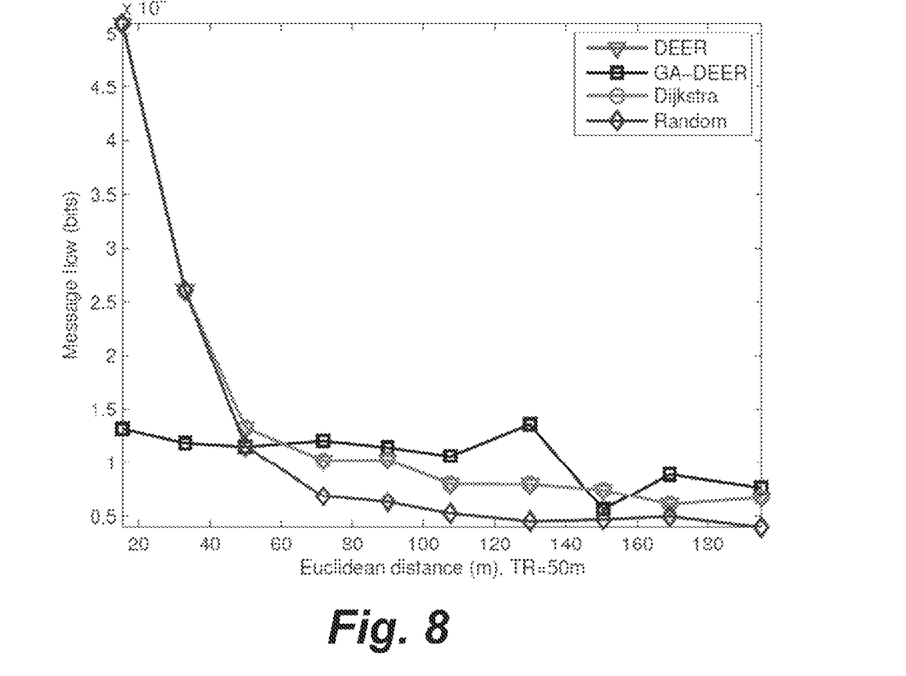

FIG. 8 shows a comparison of message flows of the four protocols. The vertical axis represents bits of message flows transmitted from a node, while the horizontal axis represents a distance between a source node and a destination node, referred to as Euclidean distance. All the protocols, except GA-DEER, have shown very high level of message flow when Euclidean distance is smaller than 50 meters, but with decreasing behavior as Euclidean distance increases. For GA-DEER, the message flow follows steady performance pattern between 0.8 to 1.4 Megabits which is very small compared to other protocols. This result demonstrates that this invention is stable and this can be attributed to innovative way of searching for the destination node.

Figure 9:
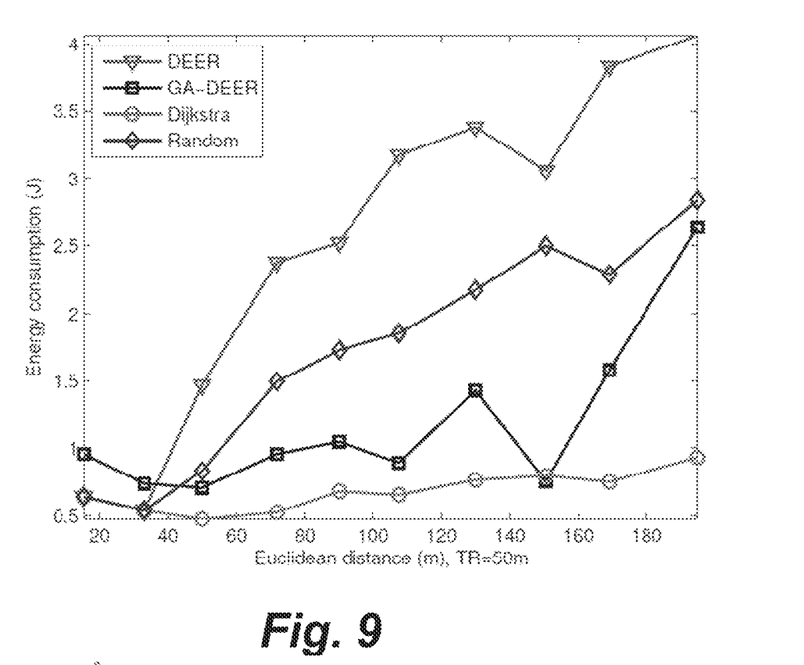

FIG. 9 shows a comparison of average energy consumption of the four protocols. The vertical axis represents average energy consumption for transmission of a packet, while the horizontal axis represents a distance between a source node and a destination node, referred to as Euclidean distance. Although the message flow is steady for GA-DEER, the energy consumption is increased for a longer travel distance. As the travel distance increases, the number of nodes available for GA-DEER decreases compared to other protocols due to the lower search angle. Hence, a few nodes will available and high transmission power is required. Other protocols show the same behavior as GA-DEER except Dijkstra. However, GA-DEER energy consumption is still the minimum compared to Random and DEER protocols.

Figure 10:
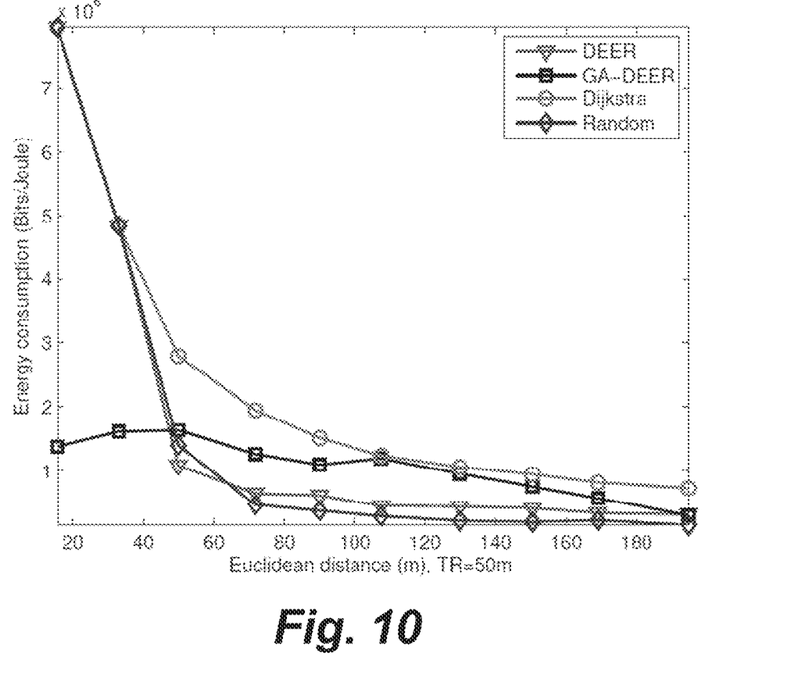

FIG. 10 shows comparison of energy efficiency of the four protocols using transmitted data bits per joule. GA-DEER performs better compared to DEER and Random when Euclidean distance is greater than 50 meters. GA-DEER performance is performing very closely to the optimal approach (Dijkstra) when the Euclidean distance is greater than 100 m while the other two protocols show very poor energy efficiency. This results is due to the effective method in selecting the path towards the destination. The threshold value of "50 m" is affected by the transmission range. Therefore, when the Euclidean distance is greater than the transmission range GA-DEER is very effective in selecting the path and energy consumption, where there is no waste especially in overhead messages as we showed in FIG. 8.

Figure 11:
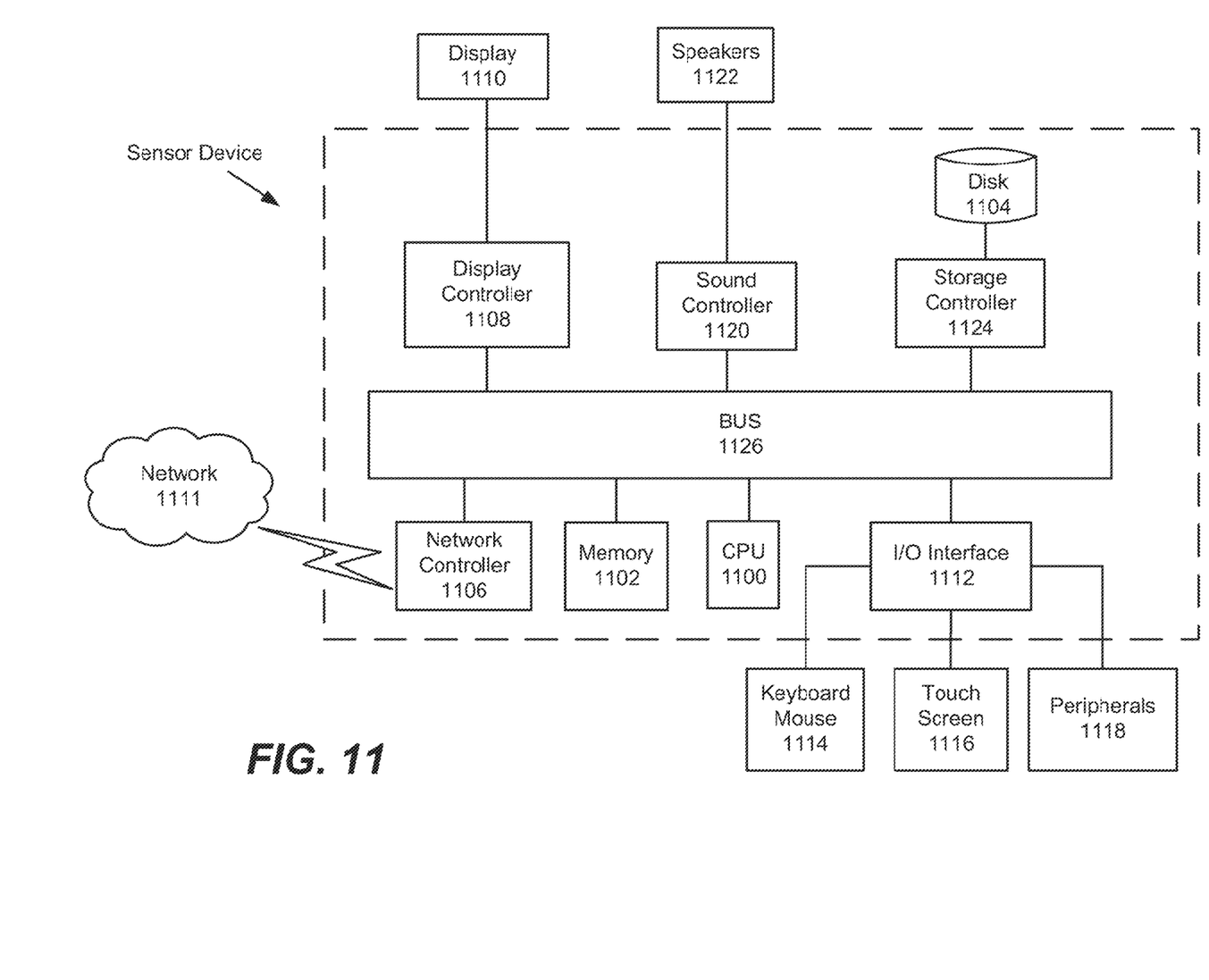
FIG. 11 show a sensor device according to an example.

FIG. 11 shows a hardware description of a sensor device according to exemplary embodiments. The sensor device can be used to implement the routing technique described herein. In FIG. 11, the sensor device includes a CPU 1100 which performs the processes described above. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the sensor device communicates, such as a server or computer.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

The hardware elements in order to achieve the sensor device may be realized by various circuitry elements, known to those skilled in the art. For example, CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The sensor device in FIG. 11 also includes a network controller 1106, such as an Intel Ethernet PRO network interface card from Intel Corporation of America, for interfacing with network 1111. As can be appreciated, the network 1111 can be a public network, such as the Internet, or a private network such as an LAN or WAN network, or any combination thereof and can also include PSTN or ISDN sub-networks. The network 1111 can also be wired, such as an Ethernet network, or can be wireless such as a cellular network including EDGE, 3G and 4G wireless cellular systems. The wireless network can also be WiFi, Bluetooth, or any other wireless form of communication that is known.

The sensor device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the sensor device, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the sensor device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The above-described hardware description is a non-limiting example of corresponding structure for performing the functionality described herein.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A density-based method for selecting a relay node at a first node for transmitting a packet from the first node to a destination node in a wireless sensor network including a plurality of nodes, comprising:
   determining a size of a bounding box surrounding the destination node based on a distance between the first node and the destination node, and/or a density of the plurality of nodes of the wireless sensor network, wherein the bounding box has a shape of a regular polygon centered at a location of the destination node, wherein the determining is based on a density of the plurality of nodes of the wireless sensor network;
   establishing a transmission angle at the first node based on the bounding box, wherein a location of the first node is the vertex of the transmission angle, and the transmission angle is a minimum angle to include the bounding box within two sides of the transmission angle;
   selecting a second node as the relay node, wherein the second node has a highest remaining energy level among energy levels of neighbor nodes of the first node within the transmission angle; and
   transmitting the packet from the first node to the destination node via the relay node.

2. The method of claim 1, wherein selecting the second node as the relay node includes:
   selecting a second node as the relay node having a remaining energy level above a threshold and having a highest remaining energy level among the neighbor nodes of the first node within the transmission angle.

3. The method of claim 2, further comprising:
   when there is no neighbor node within the transmission angle having a remaining energy level above a threshold, selecting a third node as the relay node having a remaining energy level above the threshold and having a highest remaining energy among neighbor nodes of the first node out of the transmission angle.

4. The method of claim 3, further comprising:
   when the first node does not have a neighbor node having a remaining energy level above the threshold within the transmission range, expanding the transmission range of the first node and selecting a fourth node as the relay node having a remaining energy level above the threshold and having a highest remaining energy among neighbor nodes of the first node that is within the expanded transmission range and within the transmission angle.

5. The method of claim 4, further comprising:
   when there is no neighbor node, within the expanded transmission range and within the transmission angle, having a remaining energy level above a threshold, selecting a fifth node as the relay node having a remaining energy level above the threshold and having a highest remaining energy among neighbor nodes of the first node out of the transmission angle and within the expanded transmission range.

6. The method of claim 1, further comprising:
   determining a size of the bounding box such that angle a size of the transmission angle is above a threshold.

7. The method of claim 1, further comprising:
   transmitting from the first node a request for remaining energy level information and location information of neighbor nodes of the first node.

8. The method of claim 1, wherein selecting the second node as the relay node includes:
   selecting a second node as the relay node having the maximum remaining energy among the neighbor nodes of the first node that are within the transmission angle and have not been passed by the packet.

* * * * *